US010244058B2

(12) United States Patent
Ivanov et al.

(10) Patent No.: US 10,244,058 B2
(45) Date of Patent: *Mar. 26, 2019

(54) EXTENDING FUNCTIONALITY OF APPLICATIONS (71) Applicant: Microsoft Technology Licensing, LLC, Redmond, WA (US)

(72) Inventors: Maxim Ivanov, Redmond, WA (US); Samarth Pai, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/298,162

(22) Filed: Oct. 19, 2016

(65) Prior Publication Data

US 2017/0085655 A1    Mar. 23, 2017

Related U.S. Application Data (63) Continuation of application No. 14/582,953, filed on Dec. 24, 2014, now Pat. No. 9,497,274, which is a
(Continued)

(51) Int. Cl.
*H04L 29/08* (2006.01)
*H04L 12/24* (2006.01)
(Continued)

(52) U.S. Cl.
CPC ............... *H04L 67/16* (2013.01); *G06F 8/65* (2013.01); *G06F 9/54* (2013.01); *H04L 41/0273* (2013.01);
(Continued)

(58) Field of Classification Search
CPC ..... H04L 67/16; H04L 67/20; H04L 41/5058; H04L 41/5012; H04L 67/12
See application file for complete search history.

(56) References Cited

U.S. PATENT DOCUMENTS 6,182,142 B1 * 1/2001 Win ...................... G06F 21/604
709/219
6,728,884 B1 * 4/2004 Lim .................... H04L 63/0815
709/219
(Continued)

OTHER PUBLICATIONS

"Final Office Action Issued in U.S. Appl. No. 11/715,623", dated Feb. 4, 2011, 25 Pages.
(Continued)

*Primary Examiner* — Aaron N Strange
(74) *Attorney, Agent, or Firm* — Newport IP, LLC; Scott Y. Shigeta (57) ABSTRACT

A centralized location for discovery and data exchange for web applications. Embodiments of the invention are directed to providing a centralized interface location to send data to and receive data from one or more web applications hosted on application servers different from a server hosting the centralized interface. An application developer for a subscriber having an account with the web application may therefore easily extend the functionality of one or more web applications by communicating with a single interface provided, rather than with separate interfaces for each application. The centralized interface may provide information such as a list of all web applications or functionality to which a particular subscriber has access, and may support any desired extension (e.g., addition of users).

22 Claims, 4 Drawing Sheets

Related U.S. Application Data continuation of application No. 11/715,623, filed on Mar. 8, 2007, now Pat. No. 8,930,555.

(51) Int. Cl.
    *G06F 8/65*     (2018.01)
    *G06F 9/54*     (2006.01)

(52) U.S. Cl.
    CPC ...... *H04L 41/5012* (2013.01); *H04L 41/5058* (2013.01); *H04L 67/10* (2013.01); *H04L 67/12* (2013.01); *H04L 67/20* (2013.01); *H04L 67/306* (2013.01)

(56) References Cited

U.S. PATENT DOCUMENTS

| | | | |
|---|---|---|---|
| 6,938,154 B1* | 8/2005 | Berson | G06F 21/33 713/155 |
| 6,981,041 B2* | 12/2005 | Araujo | H04L 29/06 709/222 |
| 7,305,469 B2* | 12/2007 | Leahy | G06Q 30/06 709/225 |
| 7,359,933 B1* | 4/2008 | Polen | H04L 67/34 709/203 |
| 7,480,724 B2 | 1/2009 | Zimler et al. | |
| 8,930,555 B2 | 1/2015 | Ivanov et al. | |
| 2002/0087601 A1 | 7/2002 | Anderson et al. | |
| 2003/0028451 A1 | 2/2003 | Ananian | |
| 2003/0061512 A1* | 3/2003 | Flurry | H04L 63/0815 726/4 |
| 2004/0168082 A1 | 8/2004 | Foster et al. | |
| 2004/0210662 A1 | 10/2004 | Lim et al. | |
| 2005/0015585 A1 | 1/2005 | Kurose | |
| 2005/0172149 A1 | 8/2005 | Xu et al. | |
| 2006/0041669 A1 | 2/2006 | Bemmel et al. | |
| 2006/0075398 A1 | 4/2006 | Bennett et al. | |
| 2006/0271662 A1 | 11/2006 | Fritsch et al. | |
| 2007/0223523 A1 | 9/2007 | Montpetit et al. | |
| 2008/0155653 A1 | 6/2008 | Mandato | |
| 2008/0271048 A1 | 10/2008 | Fradkov et al. | |
| 2009/0106110 A1 | 4/2009 | Stannard et al. | |
| 2010/0174826 A1 | 7/2010 | Sharma et al. | |

OTHER PUBLICATIONS

"Non Final Office Action Issued in U.S. Appl. No. 11/715,623", dated May 2, 2014, 9 Pages.

"Non Final Office Action Issued in U.S. Appl. No. 11/715,623", dated Jul. 17, 2009, 22 Pages.

"Non Final Office Action Issued in U.S. Appl. No. 11/715,623", dated Aug. 16, 2010, 24 Pages.

"Notice of Allowance Issued in U.S. Appl. No. 11/715,623", dated Aug. 27, 2014, 11 Pages.

"Final Office Action Issued in U.S. Appl. No. 11/715,623", dated Jan. 22, 2010, 24 Pages.

"Non Final Office Action Issued in U.S. Appl. No. 14/582,953", dated Dec. 3, 2015, 7 Pages.

"Notice of Allowance Issued in U.S. Appl. No. 14/582,953", dated Jul. 26, 2016, 8 Pages.

Ardagna, et al., "A web service architecture for enforcing access Control policies", Retrieved From <<https://web.archive.org/web/20051129094259/http://seclab.dti.unimi.it/papers/vodca04.pdf>>, 15 Pages.

Fox, et al., "The Gateway System: Uniform Web Based Access to Remote Resources", In Proceedings of the ACM 1999 conference on Java Grande, JAVA '99, Jun. 1, 1999, 7 Pages.

Sirer, et al., "An Access Control Language for Web Services", In Proceedings of the seventh ACM symposium on Access control models and technologies, SACMAT '02, Jun. 3, 2002, 8 Pages.

* cited by examiner

EXTENDING FUNCTIONALITY OF APPLICATIONS

CROSS-REFERENCE TO RELATED APPLICATION

This application is a continuation of, and claims priority to, U.S. patent application Ser. No. 14/582,953 filed Dec. 24, 2014, and entitled "EXTENDING FUNCTIONALITY OF WEB-BASED APPLICATIONS," which is a continuation of U.S. Pat. No. 8,930,555, application Ser. No. 11/715,623 filed Mar. 8, 2007, and entitled "EXTENDING FUNCTIONALITY OF WEB-BASED APPLICATIONS," which are herein incorporated by reference in their entirety.

BACKGROUND

As more people gain access to the Internet, more information and functionality has been made available over the World Wide Web. For example, some computer program applications offering functionality for completing a specific task or range of tasks (e.g., word processing applications) that were once available only on personal computers or on terminals in a local area network are now available via the web. These web-based applications, also referred to herein as web applications, are growing in number and many offer functionality similar to that available by computer programs executing locally on personal computers.

A web application is hosted by one or more servers and accessible via the Internet. A user of a client computer who has a subscription to the web application (i.e., has access to the web application's functionality by paying, for example, a monthly fee) accesses the web application by connecting to a server hosting the web application with a web browser executing on the client computer. A web application manager may be used to manage the status of subscriber accounts and open new subscriber accounts, and by itself be a web application.

In use, a web browser connects to the server hosting a web application and downloads the web application's interface and data associated with the web application to the client computer. In some cases, some of the functionality of the web application may also be downloaded to the client computer for local execution to increase the speed of the application by allowing some processing to be done locally rather than remotely.

The user may then, using the web browser, enter information into the interface or manipulate information using the interface, at which point the information may be transmitted back to the server for processing. The server hosting the web application may then transmit the processed data back to the client computer for further use by the user, or may store the processed data in a computer-readable medium for subsequent access by the user via the web application.

Multiple web applications may be offered by a single vendor as a suite of web applications, such as the Office Live suite of web applications available from the Microsoft Corporation of Redmond, Wash. In these cases, multiple servers may be made accessible to users via the Internet, each server or group of servers hosting a specific web application. A user may select to access any of the web applications and connect to a server hosting that application.

SUMMARY

Embodiments of the invention are directed to providing a centralized interface location to send data to and receive data from one or more web applications hosted on application servers different from a server hosting the centralized interface. An application developer for a subscriber having an account with the web application may therefore easily extend the functionality of one or more web applications by communicating with a single interface provided, rather than with separate interfaces for each application. The centralized interface may provide information such as a list of all web applications or functionality to which a particular subscriber has access, and may support any desired extension (e.g., addition of users).

In one embodiment, there is provided a method for use in a computer system comprising a web application manager that provides to each of a plurality of subscribers a subscriber account. Each subscriber account includes at least one web application from a plurality of web applications made available for inclusion in the plurality of subscriber accounts. The method comprises an act of providing to a developer for a subscriber account an application programming interface (API). The API provides a centralized discovery capability to enable the developer to discover, via a single interaction with the API, which of the plurality of web applications is included in the subscriber account.

In another embodiment, there is provided a method for use in a computer system comprising a web application manager that provides to each of a plurality of subscribers a subscriber account. Each subscriber accounts includes at least one web application from a plurality of web applications available for inclusion in the plurality of subscriber accounts. The method comprises an act of providing to a developer for a subscriber account an application programming interface (API). The API enables the developer to communicate with at least two servers, each hosting at least one of the web applications included in the subscriber account, via a third server that provides a centralized interface to the at least two servers.

In a further embodiment, there is provided an apparatus comprising a plurality of application servers. Each application server of the plurality of application servers hosts a web application. The apparatus further comprise a central server that provides a centralized interface to the plurality of application servers, and a client computer. The client computer comprises at least one computer-readable medium having encoded thereon an application programming interface (API) that enables a developer to communicate with the plurality of application servers via a central server.

DETAILED DESCRIPTION

Applicants have appreciated that conventional implementations of services that provide a suite of web applications are limited in many respects. In conventional implementations, for example, to send data to or receive data from a specific web application, a user or a computer program executing on a client computer had to connect directly to the server hosting that web application. If the user or the computer program then wanted to communicate data to a second web application, the user or the computer program would have to connect directly to a second server hosting the second web application.

Further, Applicants have appreciated that a web application's functionality may be divided across multiple servers and that this division may change as a web application is upgraded. While this division may be transparent to a conventional user of the web application (e.g., a user accessing the web application via a web browser), Applicants have appreciated that such a division may pose difficulty to third-party application developers seeking to extend the functionality of one or more of a suite of web applications because they will not know on which server a particular function is hosted.

Applicants have further appreciated that third-party application developers may more easily be able to extend the functionality of any of a suite of web applications if given a centralized interface through which to discovery the location of servers hosting particular functions of web applications or to send data to or receive data from any of the web applications, such as information on users and users' access levels (e.g., to which web applications a user/subscriber has access).

In view of the foregoing, one embodiment of the present invention is directed to providing a centralized interface for discovering the location of servers hosting particular functions of web applications or for sending data to and receiving data from a suite of web applications hosted on multiple different servers including data regarding a user's or subscriber's access level for one or more of the suite of web applications.

Figure 1:
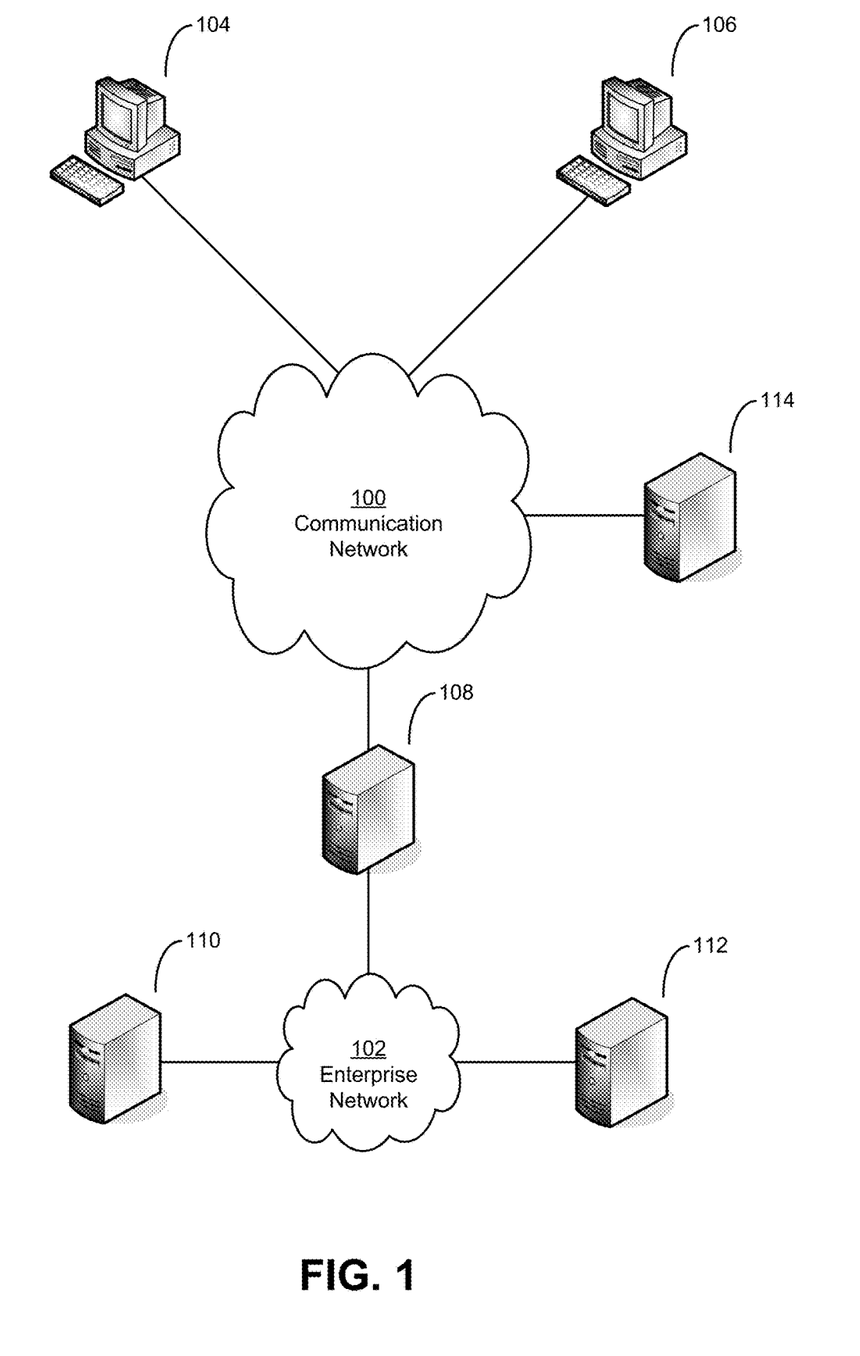
FIG. 1 is a diagram of an illustrative computer system environment in which embodiments of the invention may be implemented.

The aspects of the present invention described herein can be implemented on any of numerous computer system configurations and are not limited to any particular type of configuration. FIG. 1 illustrates one example of a computer system on which aspects of the invention can be implemented, although others are possible.

The computer system of FIG. 1 includes a communication network 100, an enterprise network 102, client computers 104 and 106, central server 108, and application servers 110 and 112. The exemplary computer system further comprises a web server 114. Communication network 100 can be any suitable wired and/or wireless communication medium or media for exchanging data between two or more computers (e.g., a server and a client), including the Internet. Enterprise network 102 can be any suitable wired and/or wireless medium or media for exchanging data between two or more computers within an enterprise or between two affiliated enterprises.

Client computers 104 and 106 can be any suitable computing device for sending and receiving data over a communication network, such as a desktop personal computer, a laptop personal computer, a personal digital assistant (PDA), a web-enabled television set, or a smart phone, among others.

Servers 108, 110, 112, and 114 can be any suitable computing device for sending data to and receiving data from one or more client computing devices over a communication network. Central server 108 provides a single interface for those seeking to extend the functionality of a web application, such as a computer program executing on a client computer 104 or a web site hosted on web server 114. Application servers 110 and 112 each host at least one web application. Application servers 110 and 112 are not shown as directly connected to communication network 100, but it should be appreciated that in some embodiments the application servers 110 and 112 may be directly connected to communication network 100. It should also be appreciated that while servers 109, 110, 112, and 114 are shown as single servers, each may be implemented in some embodiments of the invention as a network of computers sharing processing and storage demand.

As mentioned above, the embodiments of the invention described herein are not limited to being practiced with the exemplary system shown in FIG. 1. Embodiments of the invention may operate in computer system employing any number of client computers and application servers. Embodiments of the invention may also operate on systems including any number of web servers, including some wherein no web server is employed, as discussed below. Additionally, it should be appreciated that while enterprise network 102 is shown as separate from communication network 100, embodiments of the invention may operate using an enterprise network 102 that is in part or in whole communication network 100 (e.g., where enterprise network 102 comprises a Wide Area Network). In addition, in embodiments of the invention, there may be application servers connected to multiple, different enterprise networks and servers connected directly to communication network 100. In these embodiments, the application servers may then be in communication with central server 108 through communication network 100.

The functionality of a web application hosted on application server 110 may be extended in a variety of ways. An extension of functionality may involve uploading new data to a web application, and/or downloading data processed and stored by the web application to provide to another computer program. Embodiments of the invention may be used with any web applications that may be extended in any suitable way and therefore embodiments of the invention are not limited to extending the functionality of a specific web application or applications in any specific way or ways. Additionally, a user or a subscriber can be provided with the ability to extend the functionality of an application in any way, as embodiments of the invention may enable an extension of functionality of a web application in any suitable manner.

In some embodiments of the invention, to exchange data with and extend the functionality of a web application, the computer program 210 executing on a client computer 104 or web site 226 hosted by a web server 114 may communicate with a central server 108, and the central server 108 may communicate with an application server or application servers hosting the web application.

For example, in one embodiment, a user of the client computer 104 may execute a computer program 210 that extends the functionality of one or more web applications by exchanging data with the web application and processing the data in a way that the data is not processed on the web application (e.g., analyzing data stored by a web application for trends or patterns when the web application does not analyze the data for the trends or patterns). In another embodiment, a user of the client computer 104 may use a web browser 206 to connect to web server 114 and interact with a web site 226 that provides a service to extend the functionality of one or more web applications through a web interface. It should be appreciated that these embodiments are merely exemplary, and that embodiments of the invention are not limited to any specific technique for extending the functionality of a web application. It should further be appreciated that, as used herein unless otherwise noted, a user is a subscriber to a suite of web applications or has access to the suite of web applications through a subscription owned by another user, and the terms "user" and "subscriber" will therefore be used interchangeably. It should also be appreciated that a user may have access to multiple subscriptions and may have access to web applications under one subscription that the user does not have access to under a different subscription.

In an illustrative example of extending the functionality of a web application, a user may have a subscription to a suite of web applications which includes a web application, running on an application server 110, that manages a web-based list of contacts for a user. The user may also own a Personal Digital Assistant (PDA) which also stores a list of contacts for the user. The user may, as he or she meets new people, add contacts to both the list of contacts stored by the web application and the list of contacts stored on the PDA, which may result in the two lists being different. The user may then wish to keep the two lists of contacts synchronized, and so he or she may execute on a client computer 104 a computer program 210 to communicate between the PDA and the web application. Because the web application does not natively support synchronizing the contact list with a PDA, the computer program 210 extends the functionality of the web application to automatically synchronize contact lists between the PDA and the web application.

In conventional implementations of suites of web applications, the computer program 210 would have to be programmed to connect directly to an application server hosting the web application using commands that are understood by the server and data formatted in a way understood by the server. Computer program 210 would also necessarily be pre-programmed with the location of the application server to which it will connect. The computer program 210 may then be rendered non-functional if the web application is moved to a different server or if the commands the server understands are changed.

In embodiments of the invention, however, the computer program 210 may communicate directly with application server 110 after communicating with central server 108 to determine the location of application server 110. In this way, computer program 210 does not need to be programmed with the location of each application server hosting a web application, but may instead only be programmed with the location of a central server from which to discover the location of other application servers. Computer program 210 may contact central server 108 and request the location of a server hosting a particular web application or a particular function of a web application, be provided the location of application server 110 by the central server, and then initiate communication with the application server 110 to extend the functionality of the web application hosted by application server 110.

In an alternate embodiment of the invention the computer program 210 may communicate with a central server 108 separate from application servers 110 and 112, and the central server 108 may communicate with the application servers 110 and 112. Thus, the computer program 210 may send data comprising its contact list and a request for the contact list stored by the web application to the central server 108 to be relayed to the application server 110. The application server 110 may then send data comprising its contact list to the central server 108 to be relayed to the computer program 210 on client computer 104. (It should be appreciated that "data," as used herein, refers both to information to be processed and/or stored by a computer and to commands/instructions to be executed by a computer.) In this way, the computer program 210 requires no specific knowledge of the application servers that host the web application.

Further details regarding communication between a computer program 210 and an application server hosting a web application is provided below in conjunction with FIG. 3.

It should be appreciated that this is merely an illustrative example of a computer program 210 and web application, and that embodiments of the invention may operate in systems employing suitable web application whose functionality may be extended in any way.

Figure 2A:
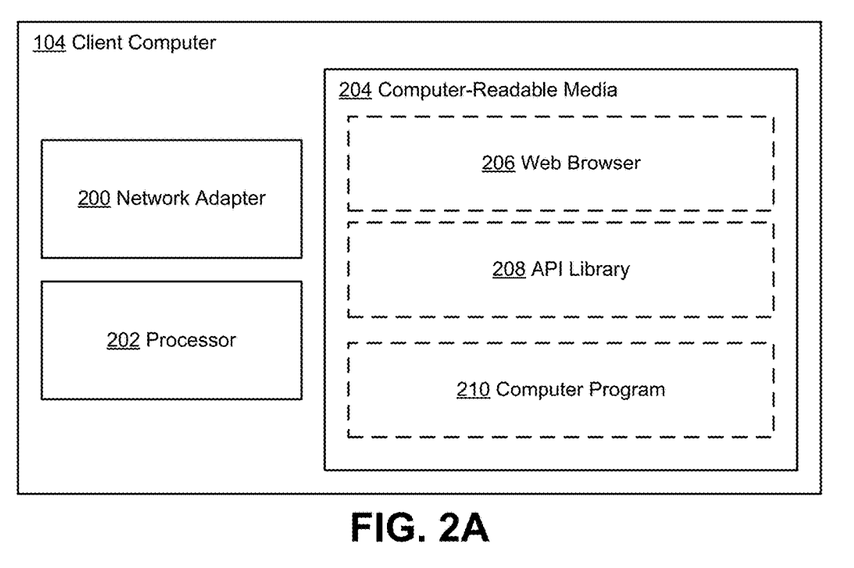
FIG. 2A is a diagram of an exemplary client computer which may be used in accordance with embodiments of the invention.
Figure 2B:
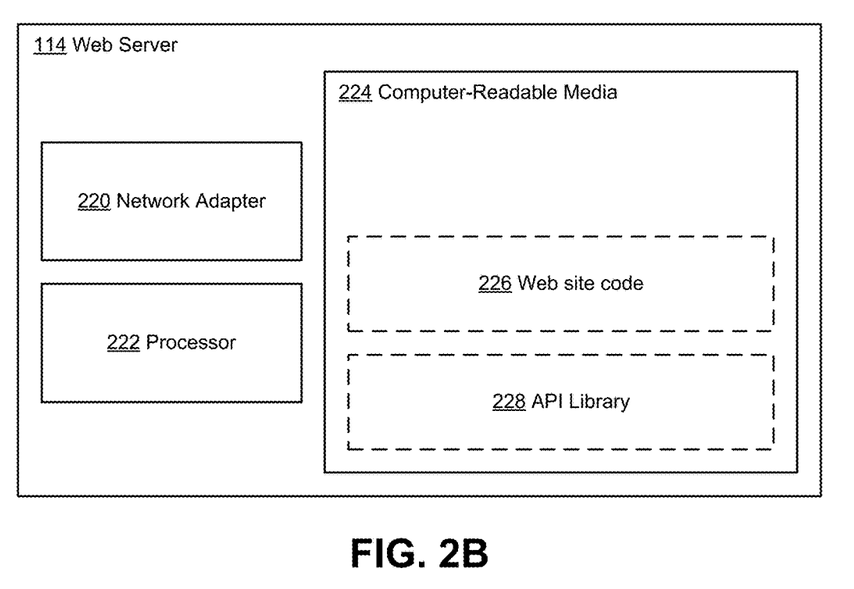
FIG. 2B is a diagram of an exemplary web server which may be used in accordance with embodiments of the invention.
Figure 2C:
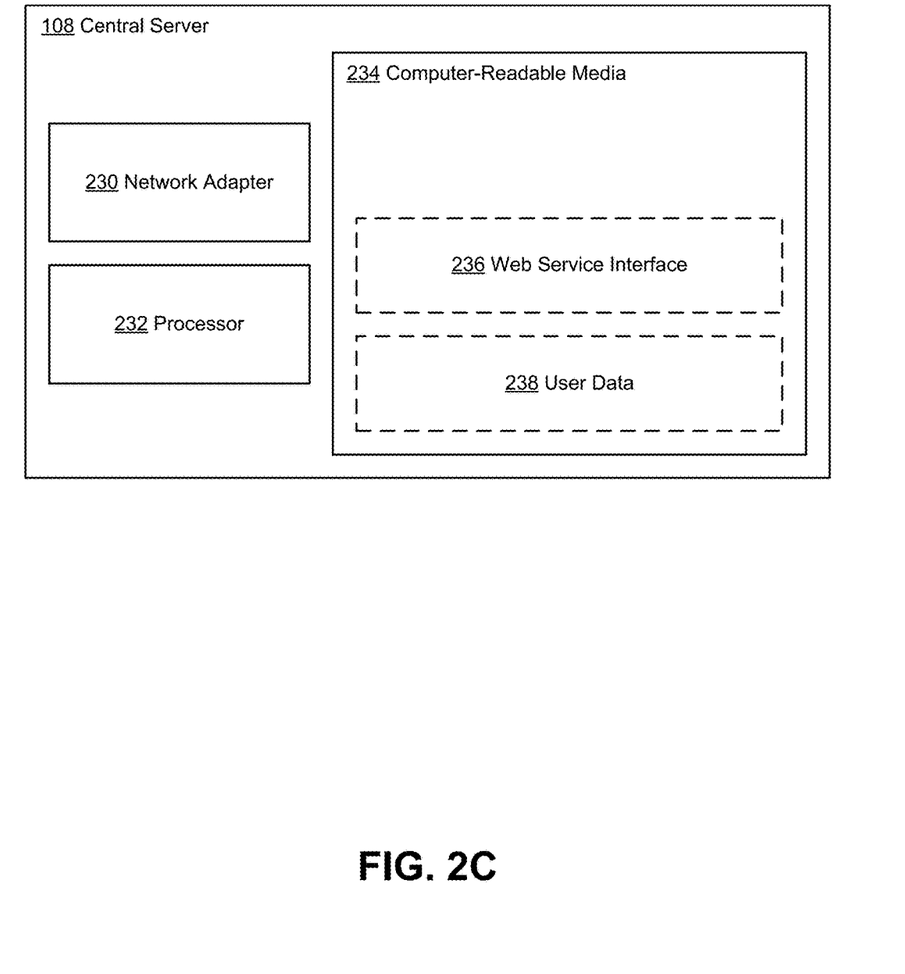
FIG. 2C is an exemplary central server which may be used in accordance with embodiments of the invention.

Elements of the exemplary computer system shown in FIG. 1 are shown in greater detail in FIGS. 2A, 2B, and 2C. FIG. 2A schematically shows an illustrative client computer 104 that may be used in accordance with one or more embodiments of the invention. Client computer 106 may be implemented similarly or differently in any suitable way. It should be appreciated that FIG. 2A is intended neither to be a depiction of necessary components for a computing device to operate as a client computer with embodiments of the invention, nor a comprehensive depiction. Client computer 104 comprises network adapter 200 to communicate with other devices connected to network 100, such as central server 108. Client computer 104 also comprises computer-readable media 204 for storing data to be processed and/or instructions to be executed by a processor 202. (It should be appreciated that any of the computer-readable media referred to herein may be a single medium or multiple media.) Processor 202 enables processing of data and execution of instructions. The data and instructions may be stored on the computer-readable media 204 and may, for example, enable communication between components of the client computer 104.

In accordance with one embodiment of the invention, the data and instructions stored on computer-readable media 204 may comprise a web browser 206 which may be used to send data to and receive data from application servers 110 and 112. The data and instructions may further comprise an application programming interface (API) 208 that may be implemented, for example, as a shared function library on the client computer 104. The API 208 may be provided by the provider of a web application whose functionality is to be extended, and comprises functions that may be called by computer programs executing on client computer 104 to interact with the web application. An API such as API 208 may comprise functions that appear simple to a developer of a computer program but carry out many complex tasks in response to the function call. These tasks may include translating data that was input to the function from a format understood by the computer program into a format understood by a remote server and transmitting that information to the remote server. Without an API having simple functions to call, the computer program would have to carry out the complex tasks itself and the developer of the computer program would require the information used by the API (e.g., the format understood by the remote server). The API 208, and exemplary functions of it, will be described in further detail below. A computer program 210 may also, in some embodiments, be stored on the computer-readable media 204 for execution on the client computer to interact with the central server 108 using the API 208. The computer program 210 may offer functionality that extends the functionality of one or more web applications, and may use the API 208 to communicate data associated with the computer program 210 and with the web application to the central server 108.

It should be appreciated that embodiments of the invention described herein are not limited to being practiced with the type of client computer illustrated in FIG. 2A, and that embodiments of the invention can be practiced with any suitable processing device as a client computer. For example, embodiments of the invention may operate a client computer 104 without a computer program 210 that can extend the functionality of a web application because the functionality that may be offered by a computer program 210 may instead be implemented in a web-based application hosted on a web server 114 rather than in a locally-executed application.

FIG. 2B schematically shows an illustrative web server 114 that may be used in accordance with one or more embodiments of the invention. It should be appreciated that FIG. 2B is intended neither to be a depiction of necessary components for a computing device to operate as a web server with embodiments of the invention, nor a comprehensive depiction. Web server 114 comprises network adapter 220 to communicate with other devices connected to network 100, such as central server 108. Web server 114 also comprises computer-readable media 224 for storing data to be processed and/or instructions to be executed by a processor 222. Processor 222 enables processing of data and execution of instructions. The data and instructions may be stored on the computer-readable media 224 and may, for example, enable communication between components of the web server 114.

In accordance with one embodiment of the invention, the data and instructions stored on computer-readable media 224 may comprise web site code 226. The web site code 226 may comprise Hypertext Markup Language (HTML) data and/or other suitable data describing web pages that may be transmitted to a client computer executing a web browser. The web pages of the web site may offer functionality that extends the functionality of one or more web applications. In one embodiment of the invention, the web site code 226 may comprise a web application that extends the functionality of one or more web applications hosted by application servers such as application server 110 and subscribed to by the user. The data and instructions may further comprise an application programming interface (API) 228—similar to API 208 and described in greater detail below—which the web server may use to communicate data associated with the web site and any web application whose functionality is being extended to the central server 108.

It should be appreciated that embodiments of the invention described herein are not limited to being practiced with the type of web server illustrated in FIG. 2B, and that embodiments of the invention can be practiced with any suitable processing device as a web server. It should be further appreciated, as stated above, that embodiments of the invention may not operate any web server 114.

FIG. 2C schematically shows an illustrative central server 108 that may be used in accordance with one or more embodiments of the invention. It should be appreciated that FIG. 2C is intended neither to be a depiction of necessary components for a computing device to operate as a central server with embodiments of the invention, nor a comprehensive depiction. Central server 108 comprises network adapter 230 to communicate with other devices connected to network 100, such as client computer 104 and web server 114. Central server 108 also comprises computer-readable media 234 for storing data to be processed and/or instructions to be executed by a processor 232. Processor 232 enables processing of data and execution of instructions. The data and instructions may be stored on the computer-readable media 234 and may, for example, enable communication between components of the central server 108.

In accordance with one embodiment of the invention, the data and instructions stored on computer-readable media 234 may comprise what is referred to herein as a web service interface 236. In one embodiment of the invention, the web service interface 236 may define a protocol to be used for communicating data between central server 108 and application servers 110 and 112, such as data comprising the contact list stored on the PDA or by the web application in the above example. In one embodiment of the invention, the protocol may be the Simple Object Access Protocol (SOAP). SOAP is a protocol for exchanging Extensible Markup Language (XML)-based messages over a communication network, typically using the Hypertext Transfer Protocol (HTTP). Message data to be exchanged is encapsulated in a SOAP envelope using XML-style tags, and exchanged between computers. SOAP is well-known in the art of data exchange and will not be described in further detail herein. It should be appreciated, however, that embodiments of the invention are not limited to implementing SOAP, and that embodiments of the invention can be practiced using any suitable communication protocol.

Computer-readable media 234 may further comprise, in some embodiments of the invention, a store of user data 238 comprising information on users or subscribers/subscriptions and access levels of the users or subscribers (e.g., to which web applications a user has access). Such data may be used, for example, by a computer program 210 or a web site 226 to determine settings for a particular user which it should use when connecting as that user (e.g., encryption settings) or to determine whether a user has access to a particular web application of which the computer program 210 or the web site 226 is able to extend the functionality.

It should be appreciated that embodiments of the invention described herein are not limited to being practiced with the type of central server illustrated in FIG. 2C, and that embodiments of the invention can be practiced with any suitable processing device as the central server.

Figure 3:
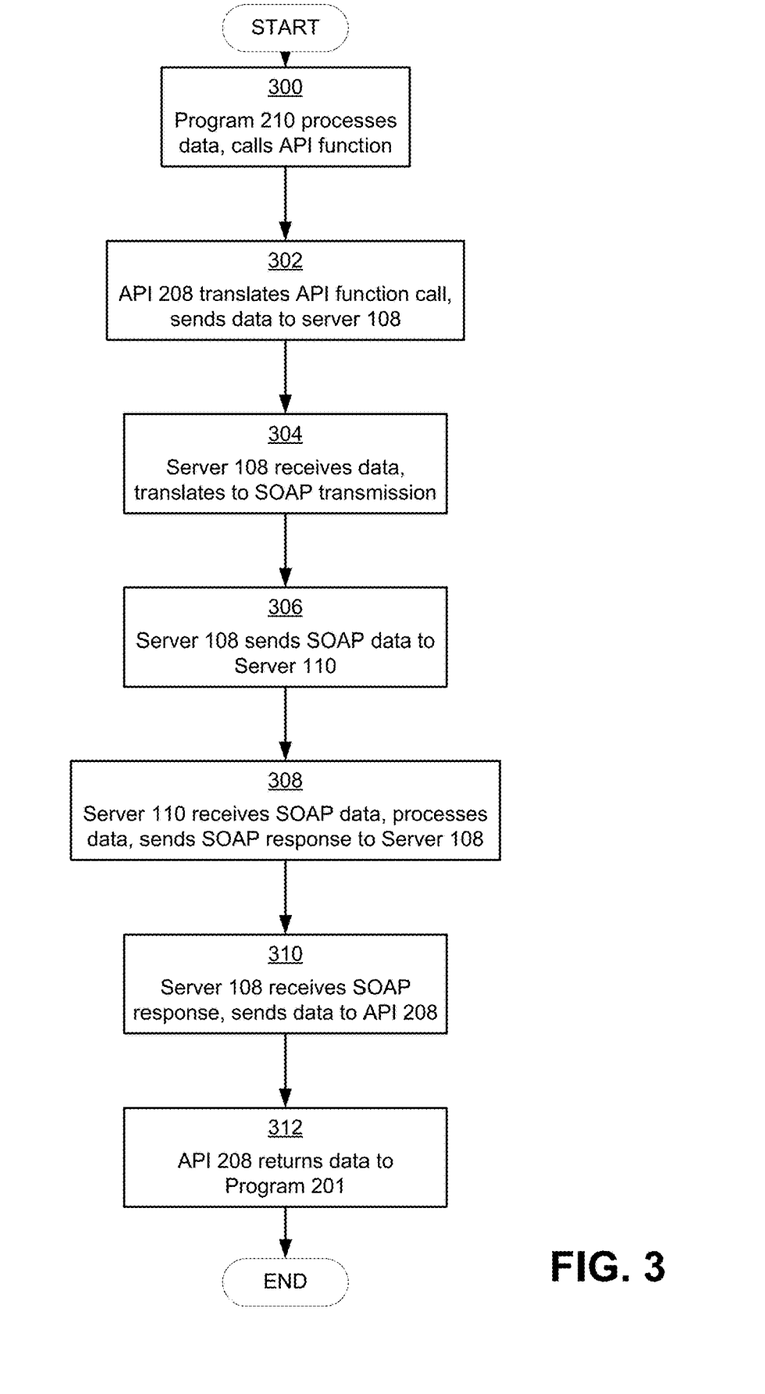
FIG. 3 is a flowchart of an illustrative method of exchanging information between a computer program executing on a client computer and a web application.

An illustrative process for using a client computer 104 to extend the functionality of one or more web applications hosted by one or more application servers such as application server 110 is shown in FIG. 3. The web application may be any web application, and its functionality may be extended in any suitable manner.

The process begins in act 300, wherein a computer program 210 executing on the client computer 104 processes data associated with the computer program 210 and a web application. Using the above example of the PDA and the web application both storing contact lists, act 300 may comprise the computer program 210 downloading from the PDA the list of contacts stored on the PDA. The computer program 210 then makes a function call to an API 208 associated with the web application, such as a function call asking the API to transmit input data (e.g., the list of contacts stored on the PDA, or a subset of the list such as a list of new or altered contacts) to the web application. In act 302, the API 208 translates the data input into the function call into a communication compatible with the central server 108 and transmits the communication to the server 108 over communication network 100. In one embodiment of the invention, the API 208 may translate the API function call into a SOAP transmission or a transmission according to any other suitable web service, or may use any other suitable format for exchanging data between computers.

Central server 108 receives the communication in act 304. In some embodiments of the invention, certain transmissions may comprise requests for information or requests for processing of data that may be handled entirely by the central server 108. In other cases, however, the central server 108 may request data from the application servers 110 and 112 in response to receiving the communication or may transmit the received communication to the application servers. In these cases, such as in the PDA example above, central server 108 may compile and, in act 306, transmit a SOAP (or any other suitable type of communication protocol) transmission to the application servers over enterprise network 102 (in the example, comprising a list of contacts stored in the PDA and a request for the contacts stored by the web application).

In act 308, application server 110 receives the SOAP communication and processes the communication in any suitable manner. The processing may include processing and/or storing data contained in the communication, retrieving data from its data store(s) in response to a received request, both processing/storing data and retrieving data, or any other suitable process. In the above PDA example, the application server 110 may examine the received list of contacts and compare each contact received to its list of contacts and update its own data store according to differences between the two lists (e.g., inserting new contacts into the list and/or updating existing contacts with, for example, new phone numbers). The application server may also, in the PDA example, retrieve from its data store a list of at least some of its contacts (e.g., as above, new or altered contacts) to transmit to the computer program 210 (this may be done prior to the insert/update operation). Act 308 continues when application server 110 transmits a SOAP (or other suitable communication protocol) response to the central server 108. The SOAP response may comprise data in response to the received communication, such as a confirmation of receipt of the communication, data that has been processed as requested by the communication, data requested by the communication, or any other suitable response. In the PDA example, the SOAP response may comprise a confirmation that the PDA's list of contacts was received as well as a list of the web application's contacts.

In act 310, the response is received by the central server 108, and data is sent back to the API 208 on the client computer 104. As discussed above, this may be in any suitable manner, including via a SOAP transmission or according to any other communication protocol. Act 310 may comprise an act of translating the SOAP transmission received from the application server 110 into a communication compatible with the client computer 104. In act 312, the API 208 receives the communication from the central server 108, translates received data into a format understandable by the computer program 210 if necessary, and provides the data to the computer program 210. At this point, the computer program 210 may have received confirmation of receipt of its data or may have received data in response to a request, and may perform suitable processing acts such as acknowledging a successful transmission (or, if appropriate, a failed transmission) to a user. In the above PDA example, act 312 may comprise comparing the list of contacts received from the web application to the list of contacts stored on the PDA, and updating the PDA's data store accordingly.

It should be appreciated that the process illustrated in FIG. 3 is merely illustrative, and other processes are possible. For example, rather than a computer program 210 executing on a client computer 104, a user of the client computer 104 may use the web browser 206 to communicate with a web site 226 hosted by the web server 114. The web site may extend the functionality of the web application, and it may be the web server that executes the API call of act 300 instead of the client computer 104. For example, a web site for a direct mail advertising company may comprise a web application that extends the functionality of the contact list web application in the PDA example by synchronizing a list of contacts to be sent direct mail advertisements.

Also, as discussed above, it should be appreciated that SOAP is one example of a web service that may be used by embodiments of the invention for transferring information between servers and that any suitable web service may be implemented.

It should be appreciated that API 208 is not limited to performing any specific task or type of tasks and that it may perform any suitable function. Below, exemplary API function calls are described, but it should be appreciated that these examples are merely illustrative of API functionality and that embodiments of the invention are not limited to supporting these exemplary functions. It should also be appreciated that while the examples are discussed with regard to API 208 stored on the client computer 104, the API 228 stored on web server 114 may be similarly configured.

While in the PDA example and the illustrative process of FIG. 3, the API 208 transmitted data to be processed by the web application, it should be appreciated that embodiments of the invention may instead or in addition transmit data associated with a user of the web application. For example, a computer program 210 may make a function call to the API to collect information about the user from the web application, such as how data associated with that user should be encrypted before transmission or decrypted upon receipt.

One embodiment of the invention will now be described that illustrates exemplary API functions for Office Live. However, embodiments of the invention are not limited to being used with Office Live or to implementing these exemplary API functions or similar functions. Embodiments of the invention may implement any suitable API functions for communicating with a suite of web applications as required or desired to extend the functionality of one or more web applications of the suite of web applications.

In one embodiment of the invention, such as one operating in connection with the Office Live suite of web applications discussed above, a function GetLiveIDSettings( ) may be supported which returns an class object of type LiveIDSettings. The GetLiveIDSettings( ) function may be defined as Web method LiveIDSettings GetLiveIDSettings( ) while a LiveIDSettings object may be defined as

```
class LiveIDSettings
{
    string Environment;
    string SiteName;
    string Policy;
}
```

The function call may be called to retrieve a LiveIDSettings object, which may comprise information on the environment for a particular user, such as, for example, whether the user is subscribed to use the American version of the suite of web applications or the European version, or, in another example, whether the user is a developer of the suite of applications and is using a beta/unreleased version of the suite of web applications or is a regular subscriber to the suite of web applications using a released version. The environment of the user may affect, for example, how data should be formatted to transmit it to the central server 108 because the format may change between versions. The LiveIDSettings object may further comprise a site name for the user, which may comprise a listing of to which suite of web applications the user is subscribed if the central server 108 handles interactions for multiple suites of web applications. The LiveIDSettings object may further comprise a policy for the user comprising security settings for the user. If, for example, a user is using one or more web applications to store sensitive or confidential data, the policy may signal that high security should be used relative to the security used for a user who is not using the web applications for sensitive data. Security settings may affect the type of encryption used for a connection to the central server 108 or may comprise the length of time that an encryption key will be valid before it should be changed to protect the encrypted connection. This information may be stored on the central server 108 or on a server accessible by the central server 108, and when the GetLiveIDSettings function is called, the API may connect to the central server 108, request this data, receive the data, and return it to the computer program 210 that called the function. The three values returned from the central server 108 (environment, site name, and policy) may then be used by the computer program 210 and/or by other functions of the API 208 called by the computer program 210 in establishing future connections to the central server 108 (or application server 110).

Another exemplary API function call may request that the web application create a new user account having access to the web application using an existing subscription. In one embodiment of the invention, the API 208 may support a CreateUser function, which may take as input a subscription identifier (i.e., an account number for a subscription for which the user should be created), an e-mail address for the new user, a username for the user, and any other suitable information. The CreateUser function may return to the computer program 210 (or web site 226) an "invitation URL" referencing a web page to send to the user for whom an account is being created which the user may visit to "confirm" that he or she wants an account for the suite of web applications using the identified subscription and to accept any terms of service associated with the suite of applications. Accordingly, the CreateUser function may be defined as Web method User CreateUser(string subscriptionId, string userEmail, string userName, out string invitationUrl)
while the User object may be defined as

```
class User
{
    string ID;
    string Name;
    string Email;
    bool IsOwner;
}
```

A further exemplary API function call may request all subscriptions for which a user has access. Because a user may have access to the suite of web applications through multiple subscriptions (for example, a first subscription through the user's employer and a second subscription through a service for which the user volunteers) and may have varying degrees of access to web applications or may be able to access different data stores (e.g., the employer's data and the service's data) depending on the subscription, the computer program 210 may allow the user to select which subscription he or she would like to use to access the one or more web applications of which the computer program 210 is extending functionality. To do so, once the user is logged in to the system, the computer program 210 may call a GetSubscriptions( ) function which returns, in any suitable format, a list of identifiers for each of the subscriptions through which a user is allowed access to the suite of web applications. The GetSubscriptions function may be defined as Web method string[ ] GetSubscriptions( )

This subscription data may be stored on the central server 108 in the user data store 238 or may be stored on another server accessible by the central server 108.

One API function call may request from a web application the version(s) of the web application(s) to which the user has access, or the version(s) of all the web application(s) available with the suite of web applications, or any suitable subset of web application(s). This may be, for example, to ensure that the computer program 210 is compatible with the web application prior to transmitting other data or in any other way interacting with the web application. The computer program 210 may be incompatible with a web application because, for example, the web application may have been upgraded since the computer program 210 was created and the computer program 210 may be configured so as to not communicate with newer versions of the web application to prevent data corruption due to incompatibility, or may be configured to require a user to upgrade the computer program 210 when the web application is upgraded.

In one embodiment of the invention, such as those operating with the Office Live suite of web applications, the API 208 may comprise a GetOfficeLiveVersion( ) function. When called, the API 208 may request from the central server 108 a suitable listing of versions of web applications. Accordingly, the GetOfficeLiveVersion( ) function may be defined as Web method OfficeLiveComponentVersion[ ] GetOfficeLiveVersion( )
while the OfficeLiveComponentVersion object may be defined as

```
class OfficeLiveComponentVersion
{
    OfficeLiveComponent Component;
    string Version;
}
``` and the OfficeLiveComponent object may be defined as

```
enum OfficeLiveComponent
{
    Shell,
    PublicSite,
    PrivateSites
}
```

The listing may be returned as a set of OfficeLiveComponentVersion objects, where each OfficeLiveComponentVersion object comprises an OfficeLiveComponent object and a version number, as well as any other suitable information. An OfficeLiveComponent object may comprise any suitable information defining a web application (in Office Live, a web application may be a "component"). In one embodiment of the invention, each application server may comprise a data store of what version or versions of a web application it supports and/or which users have access to that version or those versions, and each server may be individually queried by the central server 108 when the GetOfficeLiveVersion function is called and the API 208 requests version information. In an alternative embodiment, the central server 108 may comprise a data store of version of web applications and/or users and to which versions of web applications the users have access so that it may respond to the user's query without querying each application server.

Similarly, in one embodiment of the invention, API 208 may comprise a CheckVersionCompatibility function, which may take as input a version of the suite of web applications. This function may be similar to the GetOfficeLiveVersion( ) function in that it enables a compatibility check, but rather than returning a list of web applications and versions it may take as input a version of the suite of web applications to enable a potentially quicker check. When the function is called, the API may transmit the input version to the central server 108, which may return a Boolean (e.g., true or false) value indicating whether the suite of web applications supported by the central server 108 is of the input version, or any other suitable value. Thus, the CheckVersionCompatibility( ) function may be defined as Web method bool CheckVersionCompatibility( )

In one embodiment of the invention, the API 208 may also comprise a function to return a list of all web applications to which a user has access under an input subscription. The computer program 210 may require that a user has access to one or more web applications to extend the functionality of those or other web applications, and a developer of the computer program 210 may configure the computer program 210 to confirm that the user has access prior to attempting to exchange data with the web application. Because a user's subscription may change over time (e.g., a user upgrades from a "basic" subscription to a "premium" subscription), computer program 210 may query the central server 108 for this data each time it runs or at regular intervals. The API 208 may then, in some embodiments of the invention, implement a GetResources function, taking as input an identifier for a subscription. The GetResources function may be defined as Web method Resource[ ] GetResources(string subscriptionId) and a Resource object may be defined as

```
class Resource
{
    string Name;
    string Url;
    OfficeLiveComponent Component;
    OfficeLiveResourceType Type;
    string CustomType;
    User User;
    Role[ ] Roles;
    string UserRoleID;
}
```

An OfficeLiveResourceType object may be defined as enum OfficeLiveResourceType

```
{
    Custom,
    Site,
    BusinessApplications,
    HumanResources,
    Customers,
    Vendors,
    WebBCM,
    Projects,
    CustomerSupport,
    Jobs,
    TimeManager,
    Assets,
    Competitors,
    Documents,
    Employees,
    Estimates,
    Expenses,
    Candidates,
    Trainings,
    SbaSharing,
    TeamWorkspace,
    BlankWorkspace,
    DocumentWorkspace,
    BasicMeetingWorkspace,
    BlankMeetingWorkspace,
    DecisionMeetingWorkspace,
    SocialMeetingWorkspace,
    MultiPageMeetingWorkspace,
    Wiki,
    Blog,
    TimeManagerJP
}
``` and a Role object may be defined as

```
class Role
{
    string ID;
    string Name;
    Int64 PermissionMask;
}
```

The central server 108, upon receiving a communication from API 208 comprising the subscription and an indicator that this data has been requested, may then communicate with each of the application servers hosting one or more web applications to determine if the subscription has access to that web application, or may consult a data store of subscriber information such as user data 238. Once the central server has compiled the information, it may send the data back to the API 208, which may format the data as a set of Resource objects prior to providing it to the computer program 210. A Resource object may comprise a name of the resource (e.g., the name of the component/web application), a URL for the web application associated with the resource (e.g., an address for the application server hosting the web application), an OfficeLiveComponent object (described above), and any suitable information relating to the particular version of the web application. The Resource object may further comprise an OfficeLiveResourceType object, which may comprise a descriptor for what the web application does/is (e.g., a customer and/or vendors contact list application). In addition, the Resource object may comprise any suitable information regarding users currently using the service or the type of users allowed access to the service (e.g., a particular web application may only be available to an administrative user for the subscription).

Various exemplary functions that may, in accordance with some embodiments of the invention, be supported by API 208 have been described, but it should be appreciated that embodiments of the invention are not limited to implementing any one exemplary function or any set of the exemplary functions. Embodiments of the invention may implement an API 208 implementing any suitable function or functions.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer system associated with an application manager that provides to individual subscribers of a plurality of subscribers a subscriber account, wherein an individual subscriber account includes at least one application from a plurality of applications made available for inclusion in the plurality of subscriber accounts, the computer system comprising:

at least one processor programmed by executable instructions to carry out at least one act, the at least one act comprising:

receiving an interface call for an interface that provides a centralized discovery capability to enable a source of the interface call to discover, via an interaction with the interface, which of the plurality of applications is included in a subscriber account, wherein the source of the interface call is a first entity and the subscriber associated with the subscriber account is a second entity, the first entity and the second entity being different entities, and wherein the first entity is another application hosted by a server, and the other application discovers which of the plurality of applications is included in the subscriber account via the centralized discovery capability provided by the interface; and responding to the interface call with a listing of which of the plurality of applications is included in the subscriber account and, for at least one application of the applications included in the subscriber account, a descriptor that describes a functionality of the at least one application of the applications included in the subscriber account.

2. The computer system of claim 1, wherein the first entity is a computer program adapted to execute on a client computer, and the computer program discovers which of the plurality of applications is included in the subscriber account via the centralized discovery capability provided by the interface.

3. The computer system of claim 1, wherein the interface is a first interface, and wherein the at least one act further comprises an act of:
receiving a second interface call for a second interface that enables communication with at least two servers hosting at least two applications accessible by a user of the subscriber account via a third server that provides a centralized interface to the at least two servers; and
transmitting at least some information included in the second interface call to at least one of the at least two servers.

4. The computer system of claim 3, wherein the first interface and the second interface comprise a single interface.

5. The computer system of claim 4, wherein the at least two applications are applications capable of being discovered as included in the subscriber account via the first interface.

6. The computer system of claim 1, wherein the centralized discovery capability further enables the source of the interface call to discover, via a single interaction with the interface, of a version for each application of the plurality of applications.

7. The computer system of claim 6, wherein the centralized discovery capability further enables the source of the interface call to discover, via a single interaction with the interface, of whether a computer program is compatible with an application of the plurality of applications.

8. A method for use in a computer system comprising an application manager that provides to individual subscribers of a plurality of subscribers a subscriber account, wherein an individual subscriber account includes at least one application from a plurality of applications available for inclusion in the plurality of subscriber accounts, the method comprising:
operating at least one processor programmed by executable instructions to carry out at least one act, the at least one act comprising:
receiving, at a third server that provides a centralized interface to at least two servers, an interface call for an interface that enables communication with the at least two servers, the at least two servers hosting at least one of the applications available for inclusion in the subscriber account, the third server being a destination of a message comprising the interface call and being transmitted by a source of the interface call;
transmitting at least some information included in the interface call from the third server to a server of the at least two servers, the at least some information comprising data transmitted by the source of the interface call and a request that the data be stored by at least one of the plurality of applications, wherein the source of the interface call is another application hosted by at least one server, and the other application communicates messages to at least one of the at least two servers through the centralized interface provided by the third server; and
receiving the data stored by the application and transmitting the data stored by the application to the source of the interface call.

9. The method of claim 8, wherein the interface enables communication with the at least two servers by providing to at least one interface function call that enables retrieval of information from the third server, the information comprising addresses for the at least two servers to allow the source of the at least one interface function call to communicate with the at least two servers without knowing in advance the location of the at least two servers.

10. The method of claim 8, wherein the interface is the centralized interface, and the interface enables communication with the at least two servers through the third server by receiving and processing messages from the source of the interface call including content to be transmitted to the at least two servers and transmitting the content to the at least two servers.

11. The method of claim 10, wherein the source of the interface call is a computer program adapted to execute on a client computer, and the computer program communicates messages to at least one of the at least two servers through the centralized interface provided by the third server.

12. The method of claim 8, wherein the source may communicate, using the interface, messages to any application included in the subscriber's account hosted by any application server through the centralized interface provided by the third server.

13. The method of claim 8, wherein the centralized interface enables discovery, via a single interaction with the interface, of whether a computer program is compatible with the at least two servers.

14. An apparatus comprising:
a plurality of application servers, individual application servers of the plurality of application servers hosting at least one application;
a central server that provides a centralized interface to the plurality of application servers;
a client computer comprising at least one computer-readable medium having encoded thereon an interface that enables the client computer to transmit calls to the central server requesting that the central server aid in transmitting data to be stored by at least one of the plurality of servers; and
a server hosting another application, the server comprising at least one computer-readable medium having encoded thereon a second interface that enables the other application to communicate with a plurality of applications hosted by the plurality of application servers accessible by a user of the subscriber account via the centralized interface to the plurality of application servers;
wherein the other application requests that the server transmit the interface calls to the central server requesting that the central server aid in communicating the messages to, and the other application communicates messages to at least one application through the centralized interface provided by the central server.

15. The apparatus of claim 14, wherein the interface requests that the central server aid in communicating messages to the plurality of servers by requesting that the central server provide to the client computer information comprising addresses for at least one of the plurality of servers such that the client computer does not have to know in advance the location of the at least one of the plurality of servers.

16. The apparatus of claim 14, wherein the interface requests that the central server aid in communicating messages to the plurality of servers by requesting that the central server transmit at least some of the information contained in an interface call to the plurality of servers.

17. The apparatus of claim 16, wherein a computer program adapted to execute on the client computer requests that the client computer transmit the interface calls, and the computer program communicates with at least one application hosted by the plurality of application servers via the centralized interface.

18. A computer system associated with a source, comprising:
at least one processor programmed by executable instructions to carry out at least one act, the at least one act comprising:
sending an interface call to an interface of an application manager that provides to individual subscribers of a plurality of subscribers a subscriber account, wherein an individual subscriber account includes at least one application from a plurality of applications made available for inclusion in the plurality of subscriber accounts, wherein the application manager provides a centralized discovery capability to enable a discovery, via an interaction with the interface, which of the plurality of applications is included in the subscriber account, wherein the source is associated with the interface call and a first entity, wherein the subscriber account is associated with a second entity, the first entity and the second entity being different entities, and wherein the first entity is another application hosted by a server, and the other application discovers which of the plurality of applications is included in the subscriber account via the centralized discovery capability provided by the interface; and
receiving from the interface a listing of which of the plurality of applications is included in the subscriber account and, for at least one application of the applications included in the subscriber account, a descriptor that describes a functionality of the at least one application of the applications included in the subscriber account.

19. The computer system of claim 18, wherein the first entity is a computer program adapted to execute on the computer system, and the computer program discovers which of the plurality of applications is included in the subscriber account via the centralized discovery capability provided by the interface.

20. The computer system of claim 18, wherein the interface is a first interface, and wherein the at least one act further comprises an act of:
sending a second interface call for a second interface that enables communication with at least two servers hosting at least two applications accessible by a user of the subscriber account via a third server that provides a centralized interface to the at least two servers, and
wherein the second interface call causes a communication of at least some information included in the second interface call to at least one of the at least two servers.

21. The computer system of claim 20, wherein the first interface and the second interface comprise a single interface.

22. The computer system of claim 21, wherein the at least two applications are applications capable of being discovered as included in the subscriber account via the first interface.

\* \* \* \* \*